Oct. 2, 1956  J. J. BLOOMFIELD  2,765,055
HYDRAULIC BRAKE SYSTEM
Filed Feb. 2, 1953  3 Sheets-Sheet 1
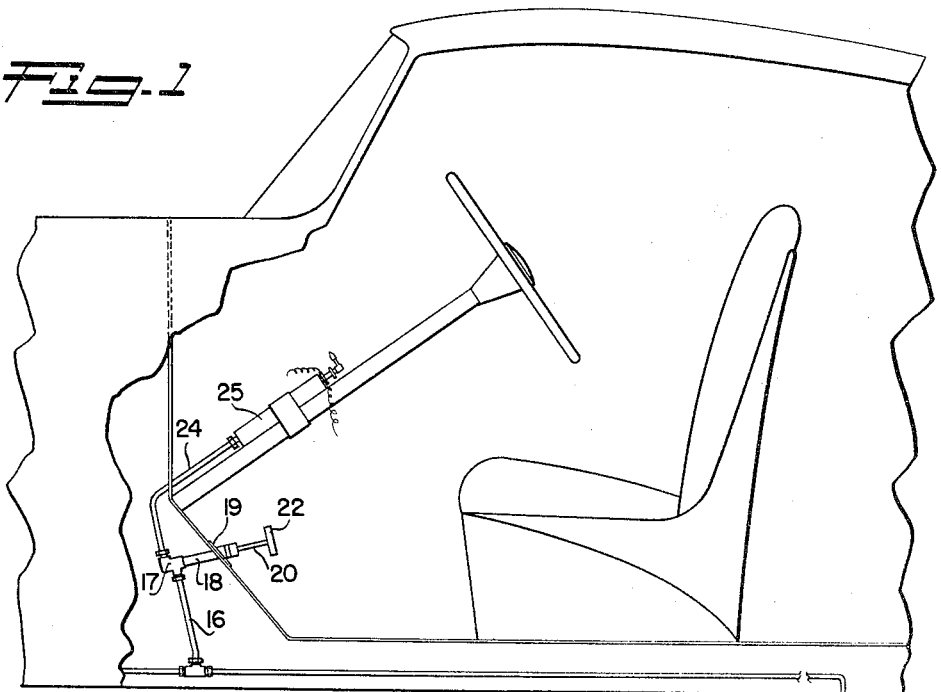
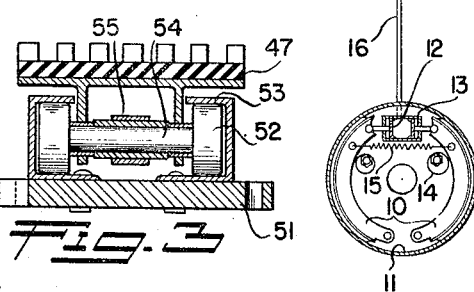
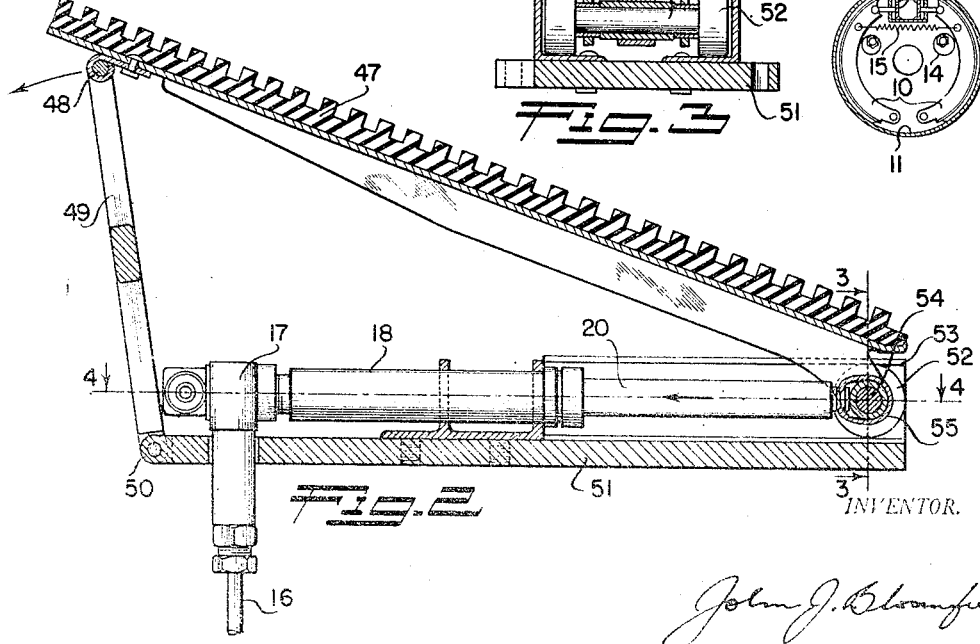
INVENTOR.
John J. Bloomfield Oct. 2, 1956 J. J. BLOOMFIELD 2,765,055
HYDRAULIC BRAKE SYSTEM
Filed Feb. 2, 1953 3 Sheets-Sheet 2
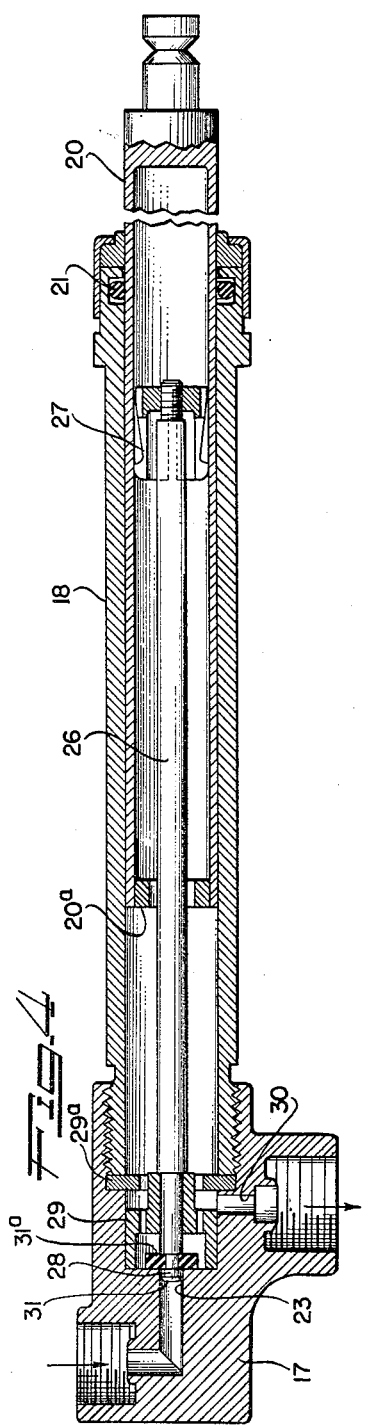
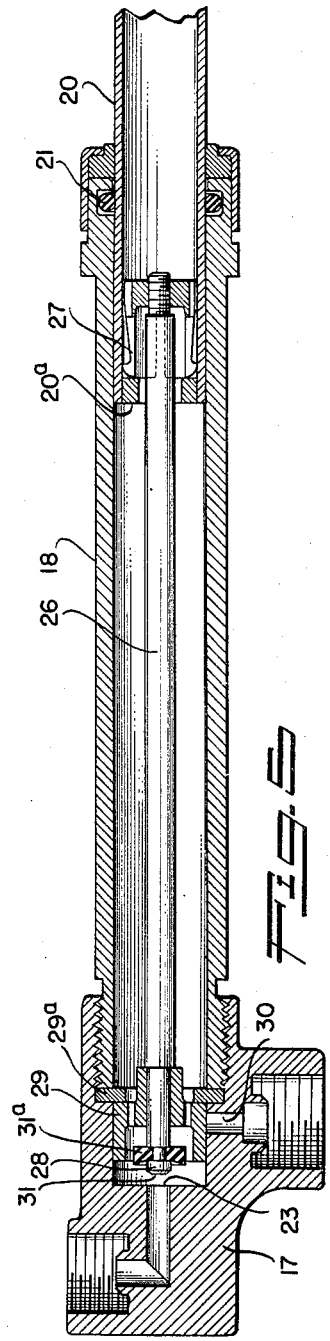
INVENTOR.
John J. Bloomfield Oct. 2, 1956     J. J. BLOOMFIELD     2,765,055
HYDRAULIC BRAKE SYSTEM
Filed Feb. 2, 1953     3 Sheets-Sheet 3
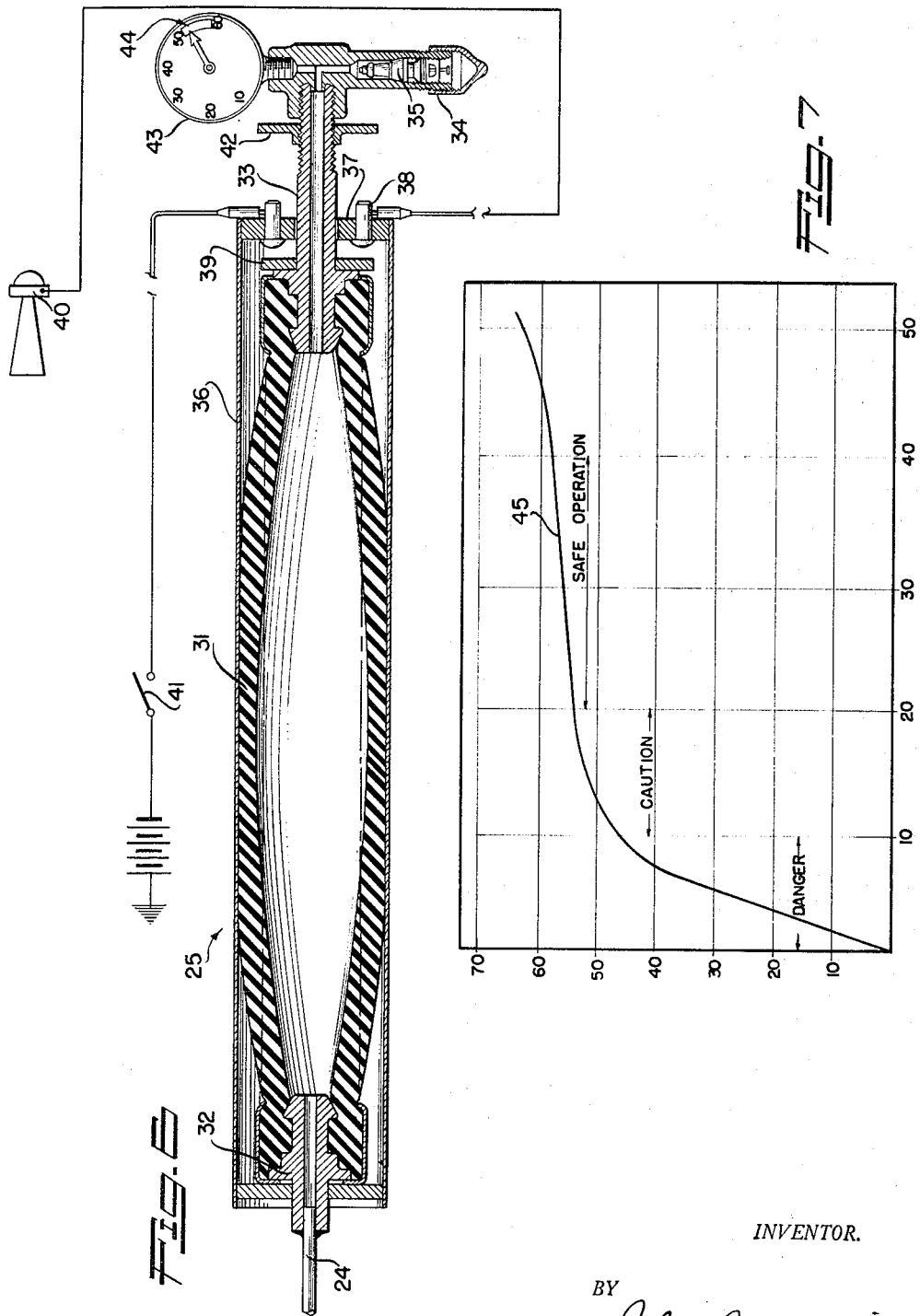
INVENTOR.
BY John J. Bloomfield

United States Patent Office 2,765,055
Patented Oct. 2, 1956

2,765,055

HYDRAULIC BRAKE SYSTEM

John J. Bloomfield, Burbank, Calif.

Application February 2, 1953, Serial No. 334,591

7 Claims. (Cl. 188—152)

This invention relates to an improved and more sensitive hydraulic brake system involving self-compensating control of the brake, and reduced braking effort by the operator.

Modern hydraulic brake systems have been universally adapted for automobiles and involve a master cylinder which is almost universally one inch in diameter. Brake cylinder dimensions, brake drum diameters, car weights, etc. are sufficiently close so that brake line pressures for a quick stop will approximate 600 p. s. i. In order to build up pressures of this order approximately 500 lbs. must be applied to the master cylinder piston. Naturally the average individual cannot be expected to exert forces of this order, so resort is had to a mechanical advantage arrangement whereby not more than 100 lbs. pressure at the pedal will give the required push on the master cylinder piston. Generally the master cylinder is mounted on the frame under the floor boards, and the pedal is hinged so that the optimum mechanical advantage is obtained when the brakes are in good condition.

In the early days of mechanical brakes with external bands it was soon learned that adequate clearance between band and drum had to be provided. If this was not done the brakes would drag. This not only was hard on fuel economy, but the drums would heat up, expand and increase the drag. The effect was cumulative and resulted in either a set of locked brakes or burned out brake lining.

The advent of internal brake shoes and external drums was almost simultaneously accompanied by hydraulic actuation of the brake shoes. The lessons learned in the days of the external band were not easily forgotten and so clearances between shoes and drum were maintained by stiff return springs which pulled the shoes back against stops. Actually close clearance between shoes and drum is not so serious a matter in the modern arrangement as it was in the old days, because drag heats the drum and the brakes free up instead of tightening with continued operation.

All modern master cylinders are of the so-called compensating type in which a port or small drilled hole connects the reserve supply of fluid with the master cylinder proper when the brake pedal is in its released position. This is provided to prevent fluid under pressure being trapped in the master cylinder and beyond, when fluid expands due to temperature rise or when hot drums start to cool off after protracted use, down a steep mountain grade.

When applying the brake we have ½ to 1 inch of travel to close the compensating port; then 1 to 1½ inch of travel to take up clearance between shoes and drum. At this point line pressures have gone up to 50 to 70 lbs. Assuming there is no air in the system the pedal now becomes surprisingly stiff and additional pressure does not move it much but line pressure goes up and braking begins. The first 1½ to 2½ inches of travel have been so much lost motion. However, this condition changes with lining wear. As the clearance increases from the normal .010 inch or so, not only does the lost motion increase but the pedal assumes a less and less favorable position and braking becomes more arduous. Fairly frequent brake adjustments are required to maintain the brakes in first-class operating condition.

The only apparent reason one can ascribe to the fact that a master cylinder with a one inch diameter and one inch stroke coupled with a pedal with a lever ratio approximately 6 to 1 and a travel of approximately six inches are in such universal use today is the fact that such pedals and such ratios were in use in the days of mechanical brakes. Precisely the same effect could be obtained by using a master cylinder of one sixth the area and having six times the stroke, operating the plunger or piston directly and eliminating the pivoted lever. This construction would result in lower cost and weight and a small increase in efficiency. However, there would be little reduction in physical effort required from the operator and there would still remain the excessive lost motion, more particularly as the brake shoes wore. Furthermore, special precautions would have to be taken to insure that the operator could not apply an excessive side load on the plunger since this would lead to binding and early destruction of the plunger packing.

Now assume that the cross-sectional area of the master cylinder be further reduced, say to one-tenth that of a standard unit and that the stroke be reduced to one-half that, of a normal brake pedal. This would take care of all the objections raised above. However, we are now faced with the serious dilemma that not only would the brakes have to be adjusted, possibly every five hundred miles of operation but the slightest entrance of air into the system or several quick stops in succession would render the system inoperative, because full pedal travel would result in merely pushing the shoes into contact with the drum. Several quick pumping strokes might build up sufficient pressure to stop the vehicle, but it is evident that a braking system which functioned as above, would hardly be suitable for modern driving conditions.

It is an object of this invention to provide a master cylinder of sufficiently small cross-sectional area and short enough stroke so that the physical effort required of the operator is materially reduced, but with which none of the shortcomings outlined above are encountered. I accomplish this by providing a substantially constant pressure hydraulic reservoir connected to the brake lines when the brake is not energized. This reservoir is pumped up to what I call the primary pressure at installation and fluctuations of temperature and normal lining wear will not appreciably affect the magnitude of the pressure. This primary pressure is not to be confused with the so-called residual pressure of some 7 to 20 p. s. i. transiently trapped in the brake lines of conventional braking systems.

It is a further object of this invention to provide a hydraulic reservoir of the type described having a pressure warning system to indicate excessive or insufficient pressure to maintain the system in operative condition.

Other objects and features of the invention will be readily understood from the following detailed description of a typical preferred form of the invention wherein reference will be made to the accompanying drawings in which:

Figure 1 is a schematic showing of the braking system of my invention, using a foot pedal applied directly to the brake pump piston;

Figure 2 shows an alternative form of pedal for operating the brake pump, this version increasing the leverage of the pedal relative to the pump as the pump piston approaches the end of its stroke;

Figure 3 is a section on the line 3—3 of Figure 2 showing the roller mounting for the pump piston end of the pedal;

Figure 4 is a longitudinal section through the brake pump taken on the line 4—4 of Figure 2 showing the pump piston on its pressure stroke;

Figure 5 is a section similar to Figure 4 showing the pump piston fully retracted;

Figure 6 is a longitudinal section through the hydraulic reservoir; and

Figure 7 is a chart of the pressure vs. volume of the reservoir.

As shown:

The brake system of my invention is intended to simultaneously operate conventional wheel brakes, one of which is shown in connection with Figure 1 as comprising a pair of brake shoes 10 expanded into frictional contact with a brake drum 11 by cup pistons 12 forced away from each other in a cylinder 13 when hydraulic pressure is applied thereto. The brake shoes 10 are normally retracted against adjustable stops 14 by a spring 15, which retraction pushes the cup pistons together when not subjected to hydraulic pressure. The several brake cylinders are interconnected by tubes 16 to a discharge port 30 of a hydraulic pump valve housing 17.

The valve housing 17 forms an end cap for a pump cylinder 18 which is either supported by a bracket 19 attached to the floor boards of an automobile, as in Figure 1, or is mounted under a treadle linkage as shown in Figure 2, to be later described. In either case, the pump details of Figures 1 and 2 are the same. A pump plunger or piston 20 is movable in the cylinder, and suitable packing 21 at the open end of the cylinder makes sealing contact with the plunger 20. As shown in Figure 1 the plunger is foot operated directly by a pedal 22 fastened on the free end of the plunger.

The valve housing 17 includes a make-up port 23 connected by a tube 24 to a constant pressure reservoir 25, to be later described in detail. The valve assembly comprises a valve rod 26, a valve actuator 27 attached to the end of the rod projecting into the interior of the plunger 20 to frictionally engage the walls of the plunger, a primary valve 28 on the other end of the rod to shut off the make-up port 23 and a sleeve valve 29 controlling the discharge port 30 to which the tube 16 is connected. The primary valve 28 consists of a pilot 31 entering the make-up port 23 and a rubber washer 31$^a$ seating against the periphery of the port. Fluid pressure on the back of the rubber washer tends to hold the valve actuator against opening movement upon return of the plunger until the high pressure of a brake application has been released by outward movement of the plunger 20. The sleeve valve 29 is fixed relative to the primary valve 28 and valve rod 26, so that closing movement of the primary valve 28 causes the sleeve valve to uncover the discharge port at the beginning of the plunger stroke and to cover the port 30 during the return movement of the plunger 20. An inwardly extending washer 29$^a$ serves to limit the return movement of the valve 29 and rod 26, responsive to friction between the actuator 27 and plunger 20. A bushing 20$^a$ on the inner end of the plunger 20 picks up the valve actuator and thus serves as a stop limiting the return stroke of the plunger, as the secondary valve seats against the washer 29$^a$.

The constant pressure reservoir 25 shown in longitudinal section in Figure 6 is used to maintain a substantially constant pressure on the pump and in the tubes 16 leading to the individual brake cylinders 13. This pressure is so chosen that in the brake released position the inherent friction in the cylinder and brake shoes will hold the shoes barely clear in the brake drums, the hydraulic pressure balancing out the retracting pressure of the spring 15. I have found in practice that a range of reservoir working pressures of 50 to 60 p. s. i. will serve my purpose and the construction of the reservoir is such as to have a usable capacity of approximately 30 cc. of fluid over this pressure range, as shown in the solid line curve of the chart shown in Figure 7. The reservoir utilizes an initially cylindrical length of heavy walled rubber tubing 31 having an end plug 32 secured to one end and connected to the tube 24, the other end having a nipple 33 secured therein and extending to a filling connection 34 having a tire valve 35 therein. The rubber tube is inflated beyond its yield point, with the inflation limited by a metal sheath 36. The limitation of diametrical expansion by the sheath 36 forces the nipple 33 to slide in an insulated disc 37 closing that end of the sheath, this sliding movement being used to operate a warning signal indicating both over and under inflation by mounting a pair of electrical contacts 38 in the disc 37 and providing a washer 39 on the left end of the nipple 33 to close an electrical circuit to a warning horn 40. The energy for the horn circuit may conveniently be taken from the ignition switch 41 of the automobile engine. The washer 39 serves to warn of over inflation, and a second and adjustable washer 42 outside the insulating disc connects the other ends of the contacts 38 to energize the warning circuit when the pressure in the reservoir becomes dangerously low. Alternatively, or additively, a pressure gage 43 may be used to indicate the reservoir pressure, and the scale thereof may have a colored area 44 indicating the desired working range of pressure.

As previously stated, operating the rubber tubing at pressures beyond its yield point provides a maximum usable fluid volume at substantially constant pressure. The solid line curve 45 in Figure 7 illustrates the pressure change with changes of volume of fluid in the tube 31. Without the restraining sheath the yielding effect might become concentrated at one point along the tube to form a blister that might inflate to rupture, resembling in this connection the inflation of tire inner tubes outside their casings. The solid line 45 in Figure 7 shows that the reservoir will maintain a relatively constant pressure of between 50 and 60 p. s. i. over a range of 15 to 45 cc. capacity, but in order to maintain a reserve at either extreme I have chosen to limit my warning system to an operating range of 20 to 40 cc., it being possible to operate the brakes in the region of 10 to 20 cc., although caution would be indicated.

The alternative or treadle operation of the pump, as shown in Figure 2, has the advantage of increasing leverage as the pump plunger is forced inwardly. This arrangement includes a foot shaped pedal 47 hinged at 48 to its top or forward edge to a supporting lever 49 hinged at 50 to a base plate 51. The bottom or heel end of the pedal is carried by rollers 52 operating in tracks 53 mounted on the base plate 51. A shaft 54 carries the pedal and rollers and, in turn, is attached to the free end of the plunger 20 of the pump by a clip 55. The pump cylinder 18 is attached to the base plate 51. With this arrangement pushing with the foot on the pedal 47 causes the lever 49 to pull the pedal forwardly so that the roller shaft 54 pushes the plunger 20 into the cylinder with increasing leverage as the lever 49 swings forward to a horizontal position. With this arrangement I find that normal pedal pressures can build up a hydraulic pressure of over 2000 p. s. i. whereas a pressure of 600 p. s. i. is adequate for full brake application. Thus it will be evident that my braking system involves a light touch on the brake pedal for normal brake applications with an adequate reserve, well within the strength of the weakest driver, resulting in a corresponding decrease in driving fatigue.

In the operation of the system the pressure reservoir maintains a substantially constant pressure in the brake lines and wheel cylinder which tends to hold the brake shoes at minimum clearance with the brake drum. Application of foot pressure to the pedal takes up this clearance with a minimum stroke of the plunger, since only a very short stroke is necessary to close the make-up port 23 and a further travel of the plunger then shifts the shoes into contact with the brake drum and further travel of the plunger then builds up braking pressure.

If the foot be now removed from the pedal, fluid returns from the brake lines 16 and acting on the full area of the plunger 20 pushes the latter out of the cylinder barrel 18. Due to frictional drag between the valve activator 27 and the plunger, the valve rod 26 would also be pulled back. However the same pressure which is acting on the plunger is also acting on the primary valve 28 so for the time being the valve rod remains stationary and the primary valve remains closed. Finally, because line pressure falls and because of additional pressure drop due to fluid friction the pressure within the cylinder falls to a point where mechanical frictional drag between the plunger and valve activator is sufficient to pull the primary valve off its seat. At the same time the secondary valve 29 slides back and covers the port 23 leading to the brake lines 16. The cylinder is in free communication with the reserve supply tank through the open primary valve and the holes in the secondary valve. While the secondary valve is covering the port to the brake lines, it does not provide a tight seal and fluid can seep from the brake lines back into the reserve supply, if line pressure is still high, or in the reverse direction if line pressure is too low. Movement of the valve rod is limited by the fact that the secondary valve contacts the washer 29a which projects into the cylinder bore.

It takes 50 to 70 lbs. line pressure to move the brake shoes off their stops and into close proximity to the drums. Under those conditions no retardation can be expected, the shoes are merely balanced between line pressure which tends to move them against the drum and return spring tension which tends to pull them back against the stops. Assume that the pressure is an even 60 p. s. i.; further assume that the shoes are dragging slightly. The drums soon warm up and clear themselves. Now friction enters the picture. Mainly the friction of the wheel cylinder pistons and cups. Because of this factor, the shoes will not follow up the drums unless the pressure is increased an additional 5 or 10 lbs. By the same token if the line pressure should fall it would have to do so, also by some 5 or 10 lbs. for the shoes to be retracted by the springs toward the stops. The point that I am trying to make here is that the hypothetical 60 lbs. pressure is not a razor sharp figure and that a pressure in the vicinity of 60 lbs. will hold the shoes in close proximity to the drums without causing excessive drag on the one hand or permitting the shoes to return to their stops on the other.

As the pedal is depressed fluid flows into the brake lines, but assume that because of friction at the wheel cylinder pistons and cups, that the 60 lbs. primary pressure has not been sufficient to push the brake shoes off their stops into close proximity to the drums. However continued travel of the plunger raises the secondary pressure and the shoes are moved into contact with the drum. Perhaps, because of excessive clearance the plunger has reached the bottom of its stroke and only 100 lbs. line or secondary pressure has been attained. This of course will provide only a puny braking effort. If load is removed from the pedal this secondary pressure will start to move the plunger back out of the barrel. The plunger will pick up the valve activator and the valve rod acted on by this force and the force exerted by primary pressure on its tip, will pull the primary valve off its seat and at the same time slide the secondary valve over the port leading to the brake lines. Fluid flow from the brake lines to the cylinder is now restricted. But this does not apply to flow from the reservoir to the cylinder. Fluid passes from the reservoir through the open primary valve, through the holes in the secondary valve and pushes the plunger back to the limit of its stroke. The simple fluid displacing device now has become a pump. In the meantime fluid has seeped from the lines back into the cylinder and reservoir until primary pressure prevails throughout the whole system. Wheel cylinder, piston and cup friction now comes to our aid and prevents the brake shoes from returning to their stops, and we are now ready to make a normal brake application. With only the lost motion required to close the primary valve, we immediately start to build up secondary pressure and positive braking ensues. By the exertion of sufficient effort the brake pedal may again be pushed to the floor, but this time secondary pressures will be 1500-1700 pounds per square inch, or approximately three times that required for a fast stop.

Friction of the plunger in the barrel is quite low so secondary pressure can be regulated very uniformly and a very smooth even brake application can be made. Unlike the conventional brake pedal which once clearance has been taken up, becomes quite rigid and thereby permits practically instantaneous pressure fluctuations to be transmitted to the brake shoes, thus making it possible to get harsh brake action; the new arrangement provides a soft pedal and braking effect is graduated not only by force exerted, but by pedal travel as well. The result is uniformly smoother brake application.

Since the secondary valve is merely a throttling device it is evident that whenever the brakes are not in use, line pressure must always equalize to reservoir pressure and no possible fluctuations of heating or cooling of brake components can ever permit air to enter the system on the one hand or for brakes to drag on the other. Furthermore once the system has been properly filled and bled of air, it is to all intents and purposes hermetically sealed and no air, water or dirt can get in to cause corrosion or wear. The system should therefore remain leakproof indefinitely.

Having described only typical forms of the invention I do not wish to be limited to the specific details herein set forth, but wish to reserve to myself any variations or modifications that may appear to those skilled in the art and fall within the scope of the following claims.

I claim:

1. A hydraulic brake system comprising in combination, hydraulically operated wheel brakes, a pump cylinder, hydraulic lines interconnecting the cylinder and the wheel brakes, a pressure reservoir connected to said cylinder through a passageway, a valve associated with said passageway to open and close the same, a plunger in said cylinder for creating brake applying pressure in said hydraulic lines, a valve actuator in frictional engagement with said plunger to move said valve actuator in response to plunger movement, said actuator being so associated with said plunger through said frictional engagement as to close said valve when said plunger is moved to create brake applying pressure, and a second valve interposed between said hydraulic lines and said cylinder, said second valve being so associated with actuator as to connect said cylinder to said hydraulic lines simultaneously with the closure of said first-mentioned valve.

2. A hydraulic brake system as set out in claim 1 wherein said second valve is carried by said valve actuator for said first mentioned valve.

3. A hydraulic brake system as set out in claim 2 wherein said valve actuator comprises a rod frictionally engaging said plunger at one end thereof.

4. A hydraulic brake system as set out in claim 3 wherein said frictionally engaging end of said rod carries a friction member which slidably engages an inner surface of said plunger.

5. A hydraulic brake system as set out in claim 1 wherein said reservoir comprises a heavy walled rubber tube, a metal sheath surrounding said tube and limiting the diametrical expansion thereof, said tube being longitudinally stretchable in said sheath so as to maintain a substantially constant pressure in said system when said valve is open.

6. A hydraulic brake system as set out in claim 5 wherein one end of said tube is secured to a nipple slidable relative to the corresponding end of said sheath, said nipple being provided with a valved filling aperture.

7. A hydraulic brake system as set out in claim 6 wherein the sliding of said nipple actuates a warning device to indicate over and under inflation of said rubber tube.

References Cited in the file of this patent

UNITED STATES PATENTS

| | | |
|---|---|---|
| 1,593,188 | Mattingly | July 20, 1926 |
| 2,140,751 | LaBrie | Dec. 20, 1938 |
| 2,148,727 | Carroll | Feb. 28, 1939 |
| 2,156,415 | Weihe | May 2, 1939 |
| 2,175,447 | Rike | Oct. 10, 1939 |
| 2,337,771 | Roberts | Dec. 28, 1943 |
| 2,371,554 | Scott-Iversen | Mar. 13, 1945 |
| 2,472,694 | Chouings | June 7, 1949 |